(12) United States Patent
Mori

(10) Patent No.: US 7,747,089 B2
(45) Date of Patent: Jun. 29, 2010

(54) IMAGE PROCESSING APPARATUS, IMAGE PROCESSING METHOD, AND IMAGE PROCESSING PROGRAM

(75) Inventor: Toshihiro Mori, Neyagawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 851 days.

(21) Appl. No.: 11/647,353

(22) Filed: Dec. 29, 2006

(65) Prior Publication Data

US 2007/0286507 A1 Dec. 13, 2007

(30) Foreign Application Priority Data

Jun. 12, 2006 (JP) ............... 2006-162721

(51) Int. Cl.
 *G06K 9/36* (2006.01)
 *G06K 9/34* (2006.01)
 *H04N 1/32* (2006.01)

(52) U.S. Cl. ............... 382/232; 382/173; 382/181; 358/539; 358/426.01

(58) Field of Classification Search ............... 382/105, 382/112–113, 135–140, 164–166, 170–171, 382/173–205, 226–253; 358/1.9, 2.1, 2.99, 358/3.01, 539, 426.01–426.16
See application file for complete search history.

(56) References Cited

U.S. PATENT DOCUMENTS

| | | | | |
|---|---|---|---|---|
| 5,465,304 A | * | 11/1995 | Cullen et al. | 382/176 |
| 5,535,013 A | * | 7/1996 | Murata | 382/239 |
| 5,784,488 A | | 7/1998 | Kuwata | |
| 6,043,823 A | | 3/2000 | Kodaira et al. | |
| 6,111,982 A | * | 8/2000 | Adachi | 382/176 |
| 6,137,905 A | * | 10/2000 | Takaoka | 382/173 |
| 6,173,073 B1 | * | 1/2001 | Wang | 382/176 |

(Continued)

FOREIGN PATENT DOCUMENTS

JP 63-127381 5/1988

(Continued)

OTHER PUBLICATIONS

Notification of Reasons for Refusal in JP 2008-102332 dated Jun. 9, 2009, and an English Translation thereof.

(Continued)

*Primary Examiner*—Manav Seth
(74) *Attorney, Agent, or Firm*—Buchanan Ingersoll & Rooney PC

(57) ABSTRACT

If a rectangular area extracted from image data is smaller than a predetermined size, the rectangular area is judged as a text area. If a rectangular area has ground pixel rate of no less than 66%, labeling pixel rate of less than 67%, and marginal pixel rate of no less than 50%, the rectangular area is judged as a large text area, and otherwise as a ground area. If a rectangular area having no less than 10 straight lines, or both no less than four straight lines and labeling pixel rate of no more than 12%, has an edge pixel rate of no less than 5%, the rectangular area is judged as a table area, and otherwise as a graph area. If a rectangular area has less than four straight lines or labeling pixel rate of greater than 12%, the rectangular area is judged as a photograph area.

21 Claims, 13 Drawing Sheets

U.S. PATENT DOCUMENTS

| | | | |
|---|---|---|---|
| 6,307,962 B1 * | 10/2001 | Parker et al. | 382/170 |
| 6,320,982 B1 * | 11/2001 | Kurzweil et al. | 382/173 |
| 6,341,178 B1 * | 1/2002 | Parker | 382/243 |
| 6,445,821 B1 * | 9/2002 | Arai | 382/209 |
| 6,718,059 B1 * | 4/2004 | Uchida | 382/176 |
| 6,891,978 B1 | 5/2005 | Takano | |
| 6,937,762 B2 | 8/2005 | Fujiwara | |
| 7,003,167 B2 * | 2/2006 | Mukherjee | 382/239 |
| 7,043,080 B1 * | 5/2006 | Dolan | 382/199 |
| 7,133,565 B2 * | 11/2006 | Toda et al. | 382/243 |
| 7,340,092 B2 * | 3/2008 | Tanaka et al. | 382/170 |
| 7,397,953 B2 * | 7/2008 | Said | 382/199 |
| 7,471,830 B2 * | 12/2008 | Lim et al. | 382/181 |
| 7,489,830 B2 * | 2/2009 | Bloomberg et al. | 382/269 |
| 7,574,055 B2 * | 8/2009 | Ahmed | 382/232 |
| 7,660,014 B2 * | 2/2010 | Yago | 358/1.9 |
| 2002/0006220 A1 * | 1/2002 | Kohchi | 382/165 |
| 2002/0037100 A1 * | 3/2002 | Toda et al. | 382/166 |
| 2002/0081030 A1 * | 6/2002 | Slavin | 382/192 |
| 2003/0081845 A1 * | 5/2003 | Mukherjee et al. | 382/239 |
| 2003/0118234 A1 * | 6/2003 | Tanaka et al. | 382/173 |
| 2004/0208368 A1 | 10/2004 | Yoshida | |
| 2005/0100232 A1 * | 5/2005 | Sakanashi et al. | 382/238 |
| 2005/0135693 A1 * | 6/2005 | Ahmed et al. | 382/251 |
| 2006/0050881 A1 * | 3/2006 | Ahmed | 380/217 |
| 2006/0104528 A1 * | 5/2006 | Tamura et al. | 382/239 |
| 2007/0189615 A1 * | 8/2007 | Liu et al. | 382/232 |
| 2008/0024843 A1 * | 1/2008 | Bloomberg et al. | 358/505 |

FOREIGN PATENT DOCUMENTS

| | | |
|---|---|---|
| JP | 09-091450 | 4/1997 |
| JP | 2001-144962 | 5/2001 |
| JP | 2002-245405 | 8/2002 |
| JP | 2002-373341 | 12/2002 |
| JP | 2003-018412 | 1/2003 |
| JP | 2003-030584 | 1/2003 |
| JP | 2003-069843 | 3/2003 |
| JP | 2003-189096 | 7/2003 |
| JP | 2004-188865 | 7/2004 |
| JP | 2004-304469 | 10/2004 |
| JP | 2005-094796 | 4/2005 |
| JP | 2005-236800 | 9/2005 |
| JP | 2005-252321 | 9/2005 |
| JP | 2005-316813 | 11/2005 |
| JP | 2006-013590 | 1/2006 |
| JP | 2006-115348 | 4/2006 |

OTHER PUBLICATIONS

Japanese Office Action dated Nov. 13, 2007 (with English Translation).

* cited by examiner

☒ MARGINAL PIXELS  
▨ NON-MARGINAL PIXELS  } BLACK PIXELS
☐ WHITE PIXELS

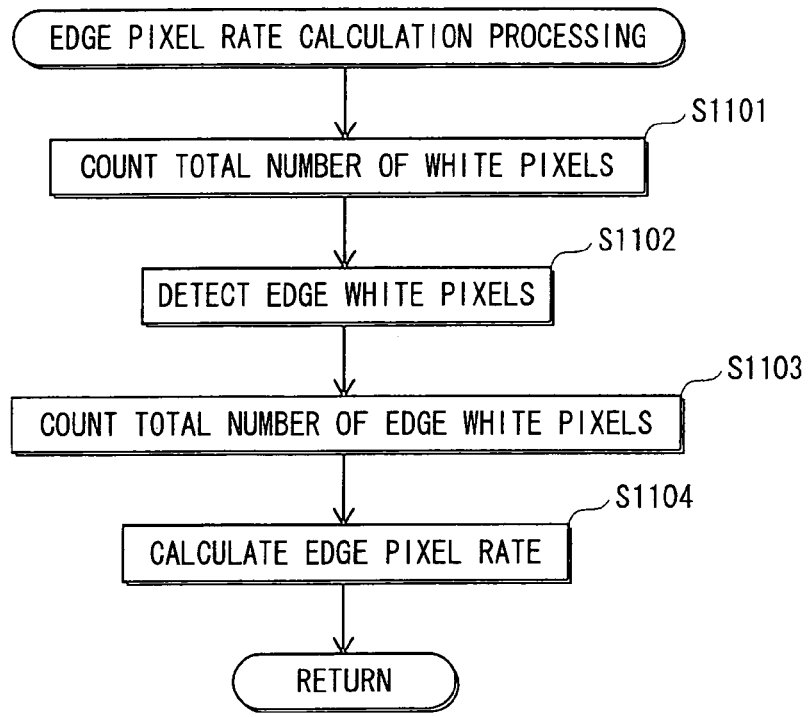

IMAGE PROCESSING APPARATUS, IMAGE PROCESSING METHOD, AND IMAGE PROCESSING PROGRAM

CROSS-REFERENCE TO RELATED APPLICATION

This application is based on application No. 2006-162721 filed in Japan, and the contents of which are hereby incorporated by reference.

BACKGROUND OF THE INVENTION (1) Field of the Invention

The present invention relates to an image processing apparatus, an image processing method, and an image processing program, and specifically to an art for compressing image files with maintaining character legibility.

(2) Related Art

In recent years, document digitization has been done increasingly in various fields, and now digital files are transmitted and received as e-mail attachments. Moreover, along with the spread of color scanners, color documents also have become converted into digital files.

In digitization of color documents, if an A4-size full color document is scanned at a resolution of 300 dpi for example, the digital file has a size of as large as approximately 25 MB. Accordingly, in general digital files of color documents (hereinafter referred to as "image file") are compressed, and then attached to e-mails.

In order to attach an image file to an e-mail, the image file needs to be lossy-compressed to sufficiently reduce a size of the image file. If an image file is lossy-compressed at a high compression ratio, a character is difficult to be read. Also, if an image file is lossy-compressed at a compression ratio in which a character can be read, the size of the image file cannot be fully reduced. Accordingly, compact PDF arts using a compression method determined depending on whether an area includes a character have been developed.

As one of such compact PDF arts, the following art is known. An image file is referred to determine character areas and non-character areas. The character area is binarized with maintaining a high resolution, and is integrated with another character area. And then, the integrated character area is lossless-compressed. Therefore, character legibility can be secured. Also, a lowering-resolution is performed on the non-character area, and simultaneously lossy-compression is performed on the non-character area. Therefore, a higher compression ratio can be achieved.

However, documents to be converted into digital files using a color scanner include documents such as magazines and catalogs including many illustrations and photographs, in addition to general business documents including texts and tables. Moreover, there is a great variety of fonts and colors used in such documents.

In conventional arts, each pixel which constitutes image data is connected to each other, and then label processing is performed on the pixels to determine an object. An area surrounded by a rectangle circumscribing the determined object and having no more than a predetermined size is judged to be a character area.

This allows the processing to be easily performed, thereby reducing processing loads. However, there is a great variety of documents to be digitized, as mentioned above. Therefore, an area that should be judged as a character area might be misjudged as a non-character area, and the misjudged area is lossy-compressed, thereby deteriorating character legibility in decompressed image data.

Particularly, if a character is included in a table or a figure, misjudgments tend to occur, thereby deteriorating character legibility.

SUMMARY OF THE INVENTION

In view of the above-described problems, the present invention aims to provide an image processing apparatus that compresses an image file using a compression method determined depending on whether a character area or not, which can perform area judgment with higher precision.

In order to achieve the above, one aspect of the present invention is an image processing apparatus that determines an area for an object in an image, and performs compression for the area using a compression method determined depending on whether the object is a character, the image processing apparatus comprising: a size judging unit operable to judge whether the area is smaller than a predetermined size; a ground judging unit operable to judge, for the area, whether a proportion of a number of pixels having a substantially common color with respect to at least one color to a total number of pixels is no less than a predetermined proportion; and a character judging unit operable, only if one of the size judging unit and the ground judging unit judges affirmatively, to judge whether the object is a character.

With the above structure, a large size area including a large character that has been conventionally lossy-compressed can be lossless-compressed by performing character judgment. This can improve legibility of even a large character in decompressed image data.

Also, another aspect of the present invention is an image processing apparatus that determines an area for an object in an image, and performs compression for the area using a compression method determined depending on whether the object is a character, the image processing apparatus comprising: a size judging unit operable to judge whether the area is smaller than a predetermined size; a straight line judging unit operable to judge whether a total number of vertical straight lines and horizontal straight lines in the area is no less than a predetermined number; and a character judging unit operable, only if one of the size judging unit and the straight line judging unit judges affirmatively, to judge whether the object is a character.

With the above structure, a large size area such as a table and a graph including vertical straight lines and horizontal straight lines that has been conventionally lossy-compressed can be lossless-compressed by performing character judgment. This can improve legibility of a character included in the table and the graph in decompressed image data.

Also, a further aspect of the present invention is an image processing apparatus that determines an area for an object in an image, and performs compression for the area using a compression method determined depending on whether the object is a character, the image processing apparatus comprising: a size judging unit operable to judge whether the area is smaller than a predetermined size; a ground judging unit operable to judge, for the area, whether a proportion of a number of pixels having a substantially common color with respect to at least one color to a total number of pixels is no less than a predetermined proportion; a straight line judging unit operable to judge whether a total number of vertical straight lines and horizontal straight lines in the area is no less than a predetermined number; and a character judging unit operable, only if one of the size judging unit, the ground judging unit, and the straight line judging unit judges affirmatively, to judge whether the object is a character.

With the above structure, both legibility of a large character and legibility of a character included in a table and a graph in decompressed image data can be improved.

In this case, with the image processing apparatus, wherein if the size judging unit judges negatively, the ground judging unit judges with respect to the area, and if the ground judging unit judges negatively, the straight line judging unit judges with respect to the area, an attribute of an area is judged in increasing order of processing load required for judgment, thereby reducing total processing load.

Also, a further aspect of the present invention is an image processing apparatus that determines an area for an object in an image, and performs compression for the area using a compression method determined depending on whether the object is a character, the image processing apparatus comprising: a size judging unit operable to judge whether the area is smaller than a predetermined size; a ground judging unit operable to judge, for the area, whether a proportion of a number of pixels having a substantially common color with respect to at least one color to a total number of pixels is no less than a predetermined proportion; and a character judging unit operable to judge whether the object is a character, if the size judging unit judges affirmatively, or if the following conditions area all satisfied: (a) the ground judging unit judges affirmatively; (b) a proportion of a number of object pixels to a total number of pixels in the area is no more than a predetermined proportion; and (c) a proportion of a number of object pixels adjacent to a non-object pixel to a total number of object pixels is no less than a predetermined proportion.

With the above structure, in an area, even if a proportion of the number of pixels having a substantially common color with respect to at least one color to a total number of pixels is no less than a predetermined proportion, character judgment is performed with respect to the area, excepting the case where the area is composed of only grounds. Therefore, processing loads in character judgment can be reduced.

Also, a further aspect of the present invention is an image processing apparatus, wherein the area including the object being a character is lossless-compressed, and the area not including the object being a character is lossy-compressed.

With the above structure, character legibility in an area including a character can be improved. Also, an area not including a character can be compressed at a higher compression ratio.

If this is the case, it is preferable to have the image processing apparatus wherein the lossless-compression is performed using an MMR system, and the lossy-compression is performed using a JPEG system.

Also, a further aspect of the present invention is an image processing apparatus, wherein the area is a rectangular area. With the above structure, processing loads can be reduced, thereby realizing speed-up in processing.

A further aspect of the present invention is an image processing method that determines an area for an object in an image, and performs compression for the area using a compression method determined depending on whether the object is a character, the image processing method comprising: a size judging step of judging whether the area is smaller than a predetermined size; a ground judging step of judging, for the area, whether a proportion of a number of pixels having a substantially common color with respect to at least one color to a total number of pixels is no less than a predetermined proportion; and a character step of judging whether the object is a character, only if one of the size judging unit and the ground judging unit judges affirmatively.

With the above structure, a large size area including a large character that has been conventionally lossy-compressed can be lossless-compressed by performing character judgment. This can improve legibility of even a large character in decompressed image data.

A further aspect of the present invention is an image processing method that determines an area for an object in an image, and performs compression for the area using a compression method determined depending on whether the object is a character, the image processing method comprising: a size judging step of judging whether the area is smaller than a predetermined size; a straight line judging step of judging whether a total number of vertical straight lines and horizontal straight lines in the area is no less than a predetermined number; and a character judging step of judging whether the object is a character, only if one of the size judging unit and the straight line judging unit judges affirmatively.

With the above structure, a large size area such as a table and a graph including vertical straight lines and horizontal straight lines that has been conventionally lossy-compressed can be lossless-compressed by performing character judgment. This can improve legibility of a character included in the table and the graph in decompressed image data.

A further aspect of the present invention is an image processing method that determines an area for an object in an image, and performs compression for the area using a compression method determined depending on whether the object is a character, the image processing method comprising: a size judging step of judging whether the area is smaller than a predetermined size; a ground judging step of judging, for the area, whether a proportion of a number of pixels having a substantially common color with respect to at least one color to a total number of pixels is no less than a predetermined proportion; a straight line judging step of judging whether a total number of vertical straight lines and horizontal straight lines in the area is no less than a predetermined number; and a character judging step of judging whether the object is a character, only if one of the size judging unit, the ground judging unit, and the straight line judging unit judges affirmatively.

With the above structure, both legibility of a large character and legibility of a character included in a table and a graph in decompressed image data can be improved.

A further aspect of the present invention is a computer readable medium storing an image processing program that determines an area for an object in an image, and performs compression for the area using a compression method determined depending on whether the object is a character, the image processing program comprising: a size judging step of judging whether the area is smaller than a predetermined size; a ground judging step of judging, for the area, whether a proportion of a number of pixels having a substantially common color with respect to at least one color to a total number of pixels is no less than a predetermined proportion; and a character step of judging whether the object is a character, only if one of the size judging unit and the ground judging unit judges affirmatively.

With the above structure, a large size area including a large character that has been conventionally lossy-compressed can be lossless-compressed by performing character judgment. This can improve legibility of even a large character in decompressed image data.

A further aspect of the present invention is a computer readable medium storing an image processing program that determines an area for an object in an image, and performs compression for the area using a compression method determined depending on whether the object is a character, the image processing program comprising: a size judging step of judging whether the area is smaller than a predetermined size; a straight line judging step of judging whether a total number of vertical straight lines and horizontal straight lines in the area is no less than a predetermined number; and a character judging step of judging whether the object is a character, only if one of the size judging unit and the straight line judging unit judges affirmatively.

With the above structure, in an area, even if a proportion of the number of pixels having a substantially common color with respect to at least one color to a total number of pixels is no less than a predetermined proportion, character judgment is performed on the area, excepting the case where the area is composed of only grounds. Therefore, processing loads in character judgment can be reduced.

A further aspect of the present invention is a computer readable medium storing an image processing program that determines an area for an object in an image, and performs compression for the area using a compression method determined depending on whether the object is a character, the image processing program comprising: a size judging step of judging whether the area is smaller than a predetermined size; a ground judging step of judging, for the area, whether a proportion of a number of pixels having a substantially common color with respect to at least one color to a total number of pixels is no less than a predetermined proportion; a straight line judging step of judging whether a total number of vertical straight lines and horizontal straight lines in the area is no less than a predetermined number; and a character judging step of judging whether the object is a character, only if one of the size judging unit, the ground judging unit, and the straight line judging unit judges affirmatively.

With the above structure, both legibility of a large character and legibility of a character included in a table and a graph in decompressed image data can be improved.

BRIEF DESCRIPTION OF THE DRAWINGS

These and other objects, advantages and features of the invention will become apparent from the following description thereof taken in conjunction with the accompanying drawings those illustrate a specific embodiments of the invention.

In the drawings:

FIG. 7A shows a rectangular area wholly filled with black pixels, and FIG. 7B shows a rectangular area expressing a character "Z" with black pixels;

FIG. 11 is a flow chart showing edge pixel rate calculation processing;

FIG. 12 shows an example of a filter that detects an diagonal edge according to the embodiment of the present invention;

DESCRIPTION OF PREFERRED EMBODIMENT

The following describes an embodiment of an image processing apparatus using an MFP (Multi-Function Peripheral) as an example, with reference to the drawings.

(1) Structure of MFP

Firstly, the structure of an MFP according to an embodiment of the present invention will be described with reference to FIG. 1.

Figure 1:
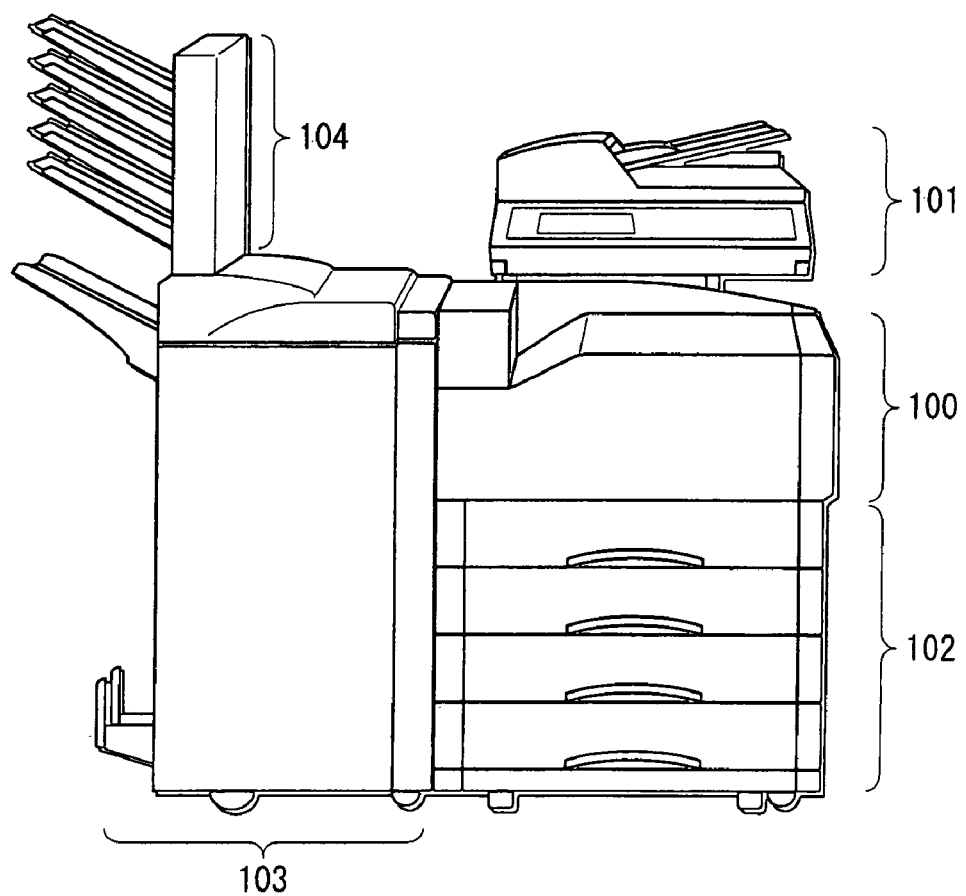
FIG. 1 is an appearance view showing an MFP (Multi-Function Peripheral) according to an embodiment of the present invention.

As shown in FIG. 1, an MFP 1 includes an image forming apparatus 100, an image scanner 101, a paper feeder 102, a finisher 103, and a multi-tray 104.

The image scanner 101 automatically feeds a document using an ADF (Automatic Document Feeder), and scans the document at a resolution of 300 dpi to obtain image data having 24-bit full color.

Incidentally, when the image scanner 101 scans an A4-size document at a resolution of 300 dpi, image data of approximately 2500×approximately 3500 pixels can be obtained.

The image forming apparatus 100 forms an image on a recording paper supplied by the paper feeder 102, based on the scanned image data. Also, the image forming apparatus 100 compresses the image data to create a file, and transmits the file as an e-mail attachment to an external apparatus connected via a network. The recording paper on which the image has been formed is discharged to the finisher 103 or the multi-tray 104.

(2) Structure of Image Forming Apparatus 100

Next, the structure of the image forming apparatus 100 will be described with reference to FIG. 2.

Figure 2:
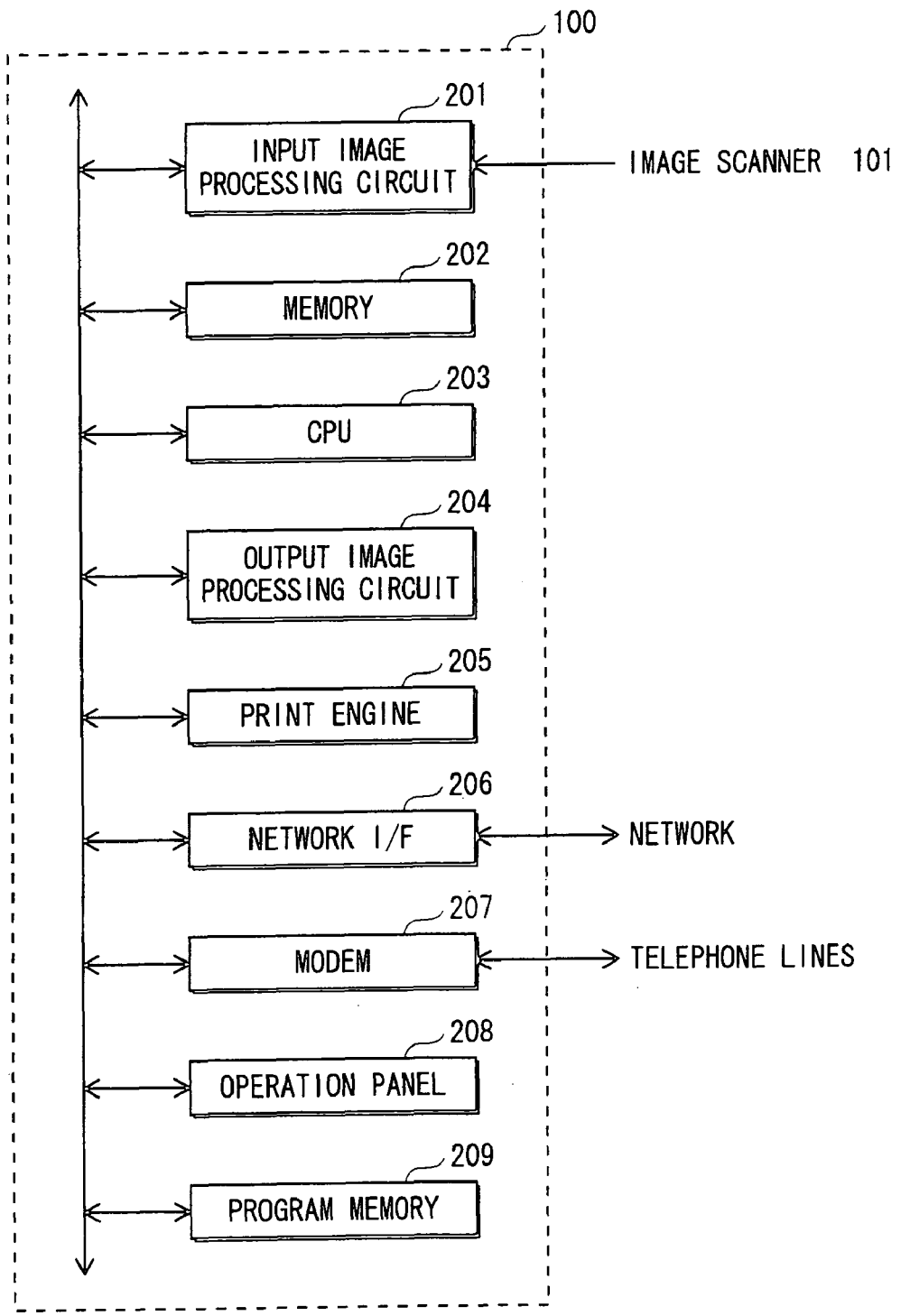
FIG. 2 is a block diagram showing a main hardware structure of an image forming apparatus 100 according to the embodiment of the present invention.

As shown in FIG. 2, the image forming apparatus 100 includes the input image processing circuit 201, a memory 202, a CPU (Central Processing Unit) 203, an output image processing circuit 204, a print engine 205, a network interface 206, a modem 207, an operation panel 208, and a program memory 209.

The input image processing circuit 201 receives the image data from the image scanner 101, and performs processing, such as color conversion, color correction, resolution conversion, and area determination, on the input image.

The memory 202 includes a semiconductor memory such as a DRAM (Dynamic Random Access Memory), and a magnetic memory such as a hard disk drive, and stores the image data processed by the input image processing circuit 201.

The program memory 209 stores programs for various processing performed by the CPU 203.

The CPU 203 reads the programs stored in the program memory 209, wholly controls the image forming apparatus 100, detects and displays key inputs of the operation panel 208, changes a file format of the image data (JPEG (Joint Photographic Experts Group), PDF, TIFF (Tagged Image File Format), compact PDF, etc.), and creates e-mails, etc.

The output image processing circuit 204 performs screen control, smoothing, PWM (Pulse Width Modulation) control, etc., to create output image data.

The print engine 205 forms an image on a recording paper in accordance with the output image data. The print engine 205 forms a color image using four colors of yellow, magenta, cyan, and black, and also forms a monochrome image using only a black color.

The network interface 206 is an interface apparatus for transmitting and receiving e-mails, etc. via the network, and performs protocol processing, etc.

The modem 207 includes a built-in NCU (Network Control Unit), and performs modulation, demodulation, and protocol processing in transmission and reception of facsimiles, interface processing with telephone lines, etc.

The operation panel 208 includes operation keys and a display panel, and receives user inputs, such as destinations of facsimiles and e-mails, selections of scanning conditions and image file formats, and instructions for starting and interrupting various processing.

(3) Structure of Input Image Processing Circuit 201

Figure 3:
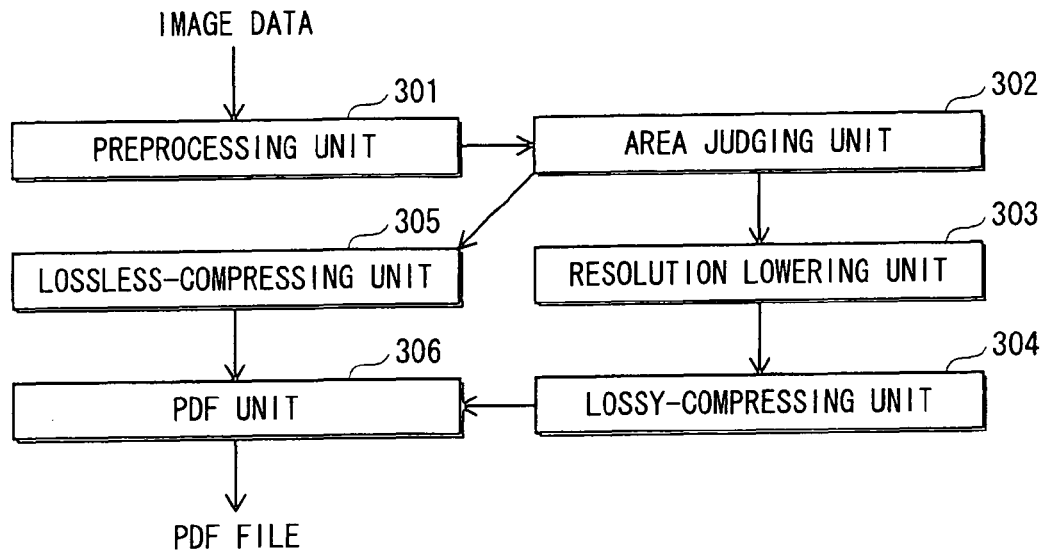
FIG. 3 is a block diagram showing a main functional structure of an input image processing circuit 201 according to the embodiment of the present invention.

Referring to FIG. 3, a main functional structure of the input image processing circuit 201 will be described. As shown in FIG. 3, the input image processing circuit 201 includes a preprocessing unit 301, an area judging unit 302, a resolution lowering unit 303, a lossy-compressing unit 304, a lossless-compressing unit 305, and a PDF unit 306.

The preprocessing unit 301 performs processing such as image format conversion, resolution conversion, and ground removing, on the image data received from the image scanner 101. The format of the image data received by the preprocessing unit 301 may be TIFF, JPEG, and BMP, for example.

As described later, the area judging unit 302 determines a plurality of areas in the 24-bit full color image data processed by the preprocessing unit 301, and judges whether a character is included in each of the determined areas. And then, the area judging unit 302 determines a representative character color in an area including a character. That is, characters included in one area are considered to have a common color.

The resolution lowering unit 303 lowers a resolution of an area judged to be a background area by the area judging unit 302.

The lossy-compressing unit 304 lossy-compresses the background area having the lowered resolution. A JPEG system may be employed for the lossy-compression, for example. This can achieve compression of the background area at a higher compression ratio.

The lossless-compressing unit 305 lossless-compresses an area judged to be a character area by the area judging unit 302. An MMR (Modified Modified READ) system may be employed for the lossless-compression, for example. This can avoid deterioration of character legibility in the character area due to the compression processing.

The PDF unit 306 receives the compressed image data from the lossy-compressing unit 304 and the lossless-compressing unit 305, creates a PDF file and outputs the PDF file. The PDF file outputted by the PDF unit 306 is transmitted as an e-mail attachment via the MFP 1 or other e-mail terminals.

(4) Operation of Area Judging Unit 302

Next, operations of the area judging unit 302 will be described with reference to a flow chart shown in FIG. 4.

Figure 4:
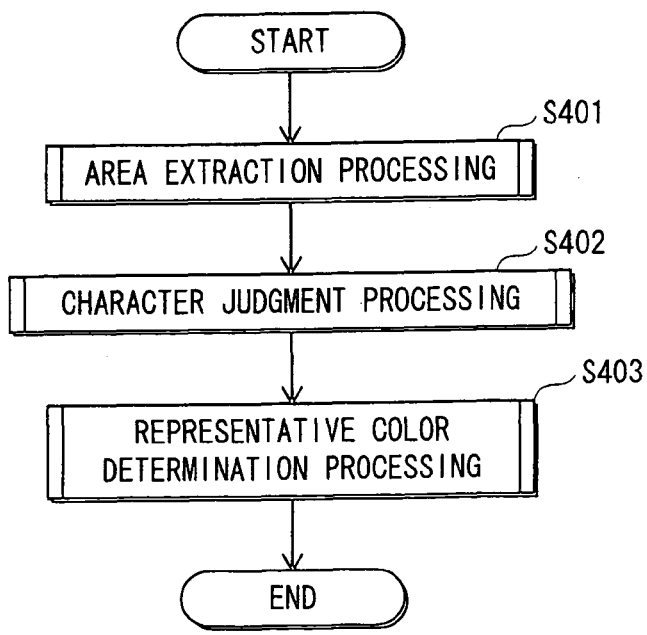
FIG. 4 is a flow chart showing operations of an area judging unit 302 according to the embodiment of the present invention.

As shown in FIG. 4, the area judging unit 302 firstly determines a plurality of areas in a piece of image data (area extraction processing: S401), and judges whether a character is included in each determined area (character judgment processing: S402).

The area judging unit 302 determines a representative character color in an area including a character (representative color determination processing: S403).

(a) Area Extraction Processing (S401)

Next, the area extraction processing (S401) performed by the area judging unit 302 will be described in detail with reference to a flow chart shown in FIG. 5.

Figure 5:
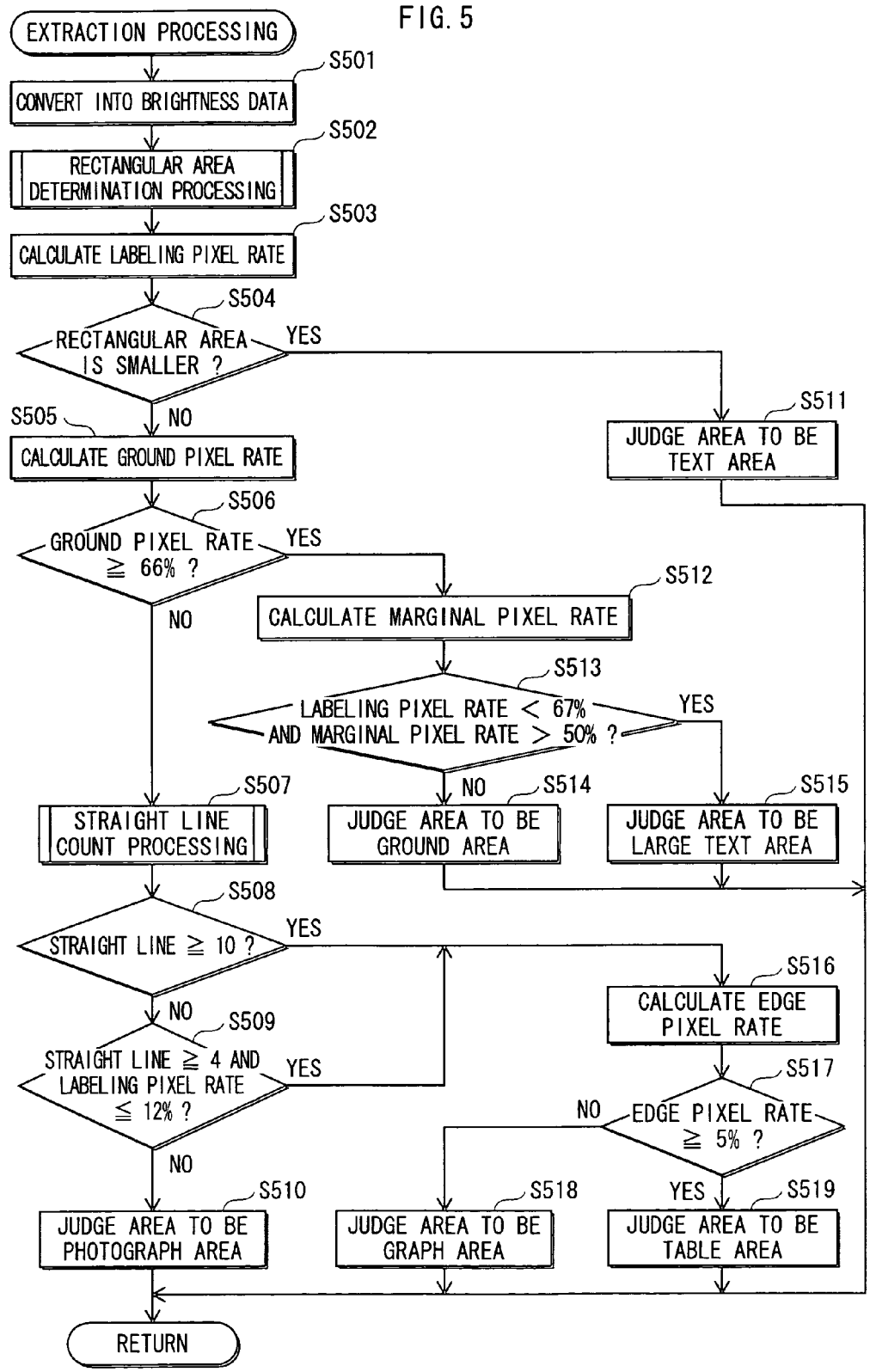
FIG. 5 is a flow chart showing in detail area extraction processing (S401) according to the embodiment of the present invention.

As shown in FIG. 5, the area judging unit 302 converts image data having 24-bit color into brightness data (gradation value) (S501). That is, the area judging unit 302 calculates a brightness value of the image data having 24-bit color to create 8-bit grayscale image data. This can improve judgment precision, and simultaneously reduce processing loads.

Moreover, the area judging unit 302 performs smoothing on the image data. This can remove noises such as isolated points and spots from the image data, thereby reducing misjudgments.

Next, the area judging unit 302 performs rectangular area determination processing (S502) for determining a rectangular area to be judged. And then, the area judging unit 302 calculates a labeling pixel rate for each determined rectangular area (S503). The labeling pixel rate indicates a proportion of the number of black pixels to the total number of pixels in a rectangular area.

Figure 6:
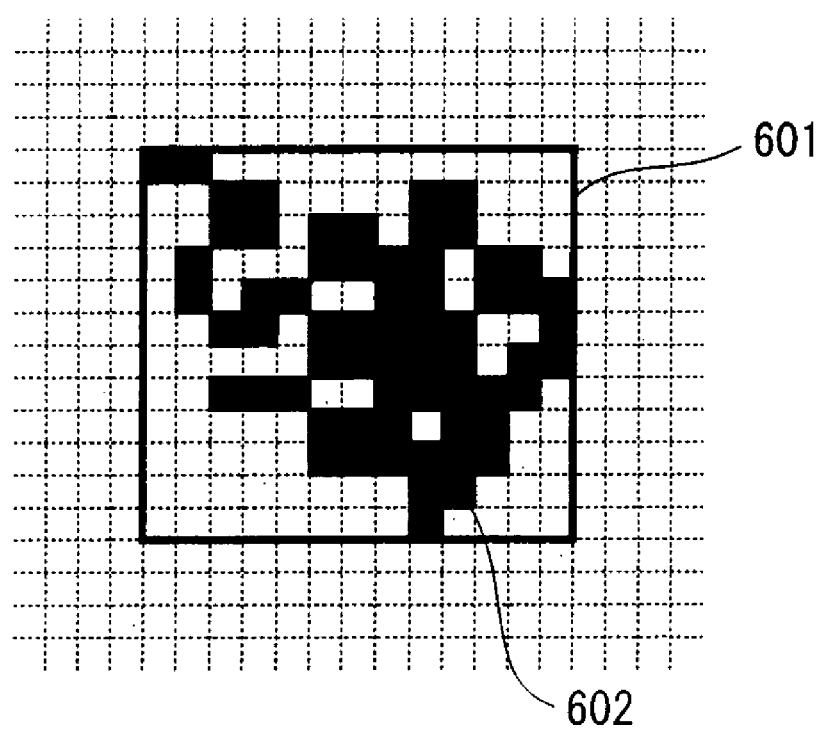
FIG. 6 shows an example of black pixels having a common label and a circumscribed rectangle thereof.

FIG. 6 shows an example of black pixels each having a common label and a circumscribing rectangle thereof. A circumscribed rectangle 601 is a smallest rectangle that surrounds black pixels 602. That is, an area surrounded by a circumscribed rectangle is a smallest rectangular area including black pixels each having a common label. The rectangular area 601 has 64 black pixels, and 156 pixels in total. Accordingly, the rectangular area 601 has a labeling pixel rate of 41%.

Next, the area judging unit 302 separately performs the following processing on each of all the rectangular areas. That is, the area judging unit 302 firstly judges whether a size of a rectangular area is smaller than a predetermined size. In the present embodiment, if the rectangular area has a width and height of no more than 250 and no more than 250 pixels, the area judging unit 302 judges that the size of the rectangular area is smaller than the predetermined size, and therefore judges that the rectangular area is a text area (S511).

If the size of the rectangular area is not smaller than the predetermined size (S504: NO), the area judging unit 302 calculates a ground pixel rate of the rectangular area (S505). The ground has a characteristic in that each labeling pixel has a substantially common color.

In the present embodiment, the area judging unit 302 firstly performs smoothing on 24-bit full color image data, for calculating the average of gradation values for each rectangular area of 8×8. The area judging unit 302 calculates a histogram of gradation values for each color component of red, green, and blue. And then, the area judging unit 302 calculates the total of frequencies (the number of pixels) within a range of plus or minus 16 of a mode of gradation values for each color component.

For example, if a mode of gradation values is 50, the area judging unit 302 calculates the number of pixels within a range of gradation values of 34 to 66. The area judging unit 302 calculates, as a ground pixel rate, a proportion of the total values calculated for each color component to 3 times the total number of pixels in the rectangular area.

As described above, the image data is compressed to one-eighth to create a histogram, and a peak of the histogram is detected, thereby removing pixels such as dots in which a sharp peak tends to be undetected and monochrome line drawings.

If the rectangular area has a ground pixel rate of no less than 66% (S506: YES), the area judging unit 302 calculates a marginal pixel rate of the rectangular area (S512). Here, the marginal pixel rate indicates a proportion of the number of black pixels adjacent to a white pixel to the total number of black pixels in the rectangular area.

Grounds and large texts differ in complexity of forms. Accordingly, large texts have a labeling pixel rate lower than that of grounds, and have a marginal pixel rate higher than that of grounds.

Figure 7A:
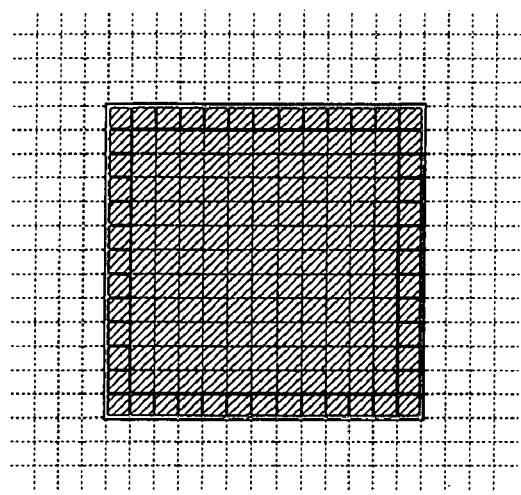
FIGS. 7A and 7B show an example of rectangular areas, specifically
Figure 7B:
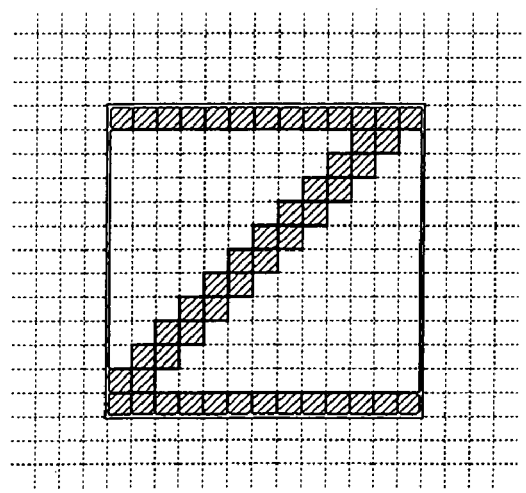

FIG. 7A shows a case where a whole 13×13 rectangle area is filled with black pixels, and FIG. 7B shows a case where a character "Z" is expressed with black pixels within a 13×— rectangle area. Each rectangular area mentioned above has 169 pixels.

The rectangular area shown in FIG. 7A has a labeling pixel rate of 100%, which is no less than the reference value of 67%. Also, the rectangular area shown in FIG. 7A has 169 black pixels to 48 marginal pixels. Accordingly, the rectangular area shown in FIG. 7A has a marginal pixel rate of 28%. The rectangular area shown in FIG. 7B has 48 black pixels and 48 marginal pixels. Accordingly, the rectangular area shown in FIG. 7B has a marginal pixel rate of 100%.

Here, if a rectangular area has a labeling pixel rate of less than 67% and a marginal pixel rate of more than 50% (S513: YES), the area judging unit 302 judges that the rectangular area is a large text area (S515). Also, if a rectangular area has a labeling pixel rate of no less than 67% or a marginal pixel rate of no more than 50% (S513: NO), the area judging unit 302 judges that the rectangular area is a ground area (S514).

If a rectangular area has a ground pixel rate of less than 66% (S506: NO), the area judging unit 302 performs straight line count processing for calculating the total of the number of straight lines in a main scanning direction and the number of straight lines in a subscanning direction in each area (S507).

If the calculated total number of the straight lines is no less than 10 (S508: YES), or if the calculated total number of the straight lines is no less than four and a labeling pixel rate of the rectangular area is no more than 12% (S509: YES), the area judging unit 302 calculates an edge pixel rate of the rectangular area (S516). In the present embodiment, the edge pixel rate indicates a proportion of the number of edge pixels in an oblique direction to the total number of black pixels within a rectangular area. An edge pixel indicates a pixel that has a density greatly different from that of surrounding pixels and forms an edge in an image.

If the rectangular area has an edge pixel rate of no less than 5% (S517: YES), the area judging unit 302 judges that the rectangular area is a table area (S519).

Moreover, if a rectangular area has an edge pixel rate of less than 5% (S516: NO), the area judging unit 302 judges that the rectangular area is a graph area (S518).

If a rectangular area has less than four straight lines or a labeling pixel rate of greater than 12% (S509: NO), the area judging unit 302 judges that the rectangular area is a photograph area (S510), and the judgment processing ends.

The rectangular areas judged to be the text area, the large text area, the graph area, and the table area, as described above, are processed as character areas in the subsequent processing. The ground area and the photograph area are processed as non-character areas not including a character.

In this way, even if the area judging unit 302 judges that a size of a rectangular area is larger than the predetermined size, the area judging unit 302 further judges whether character judgment needs to be performed on the area based on parameters such as a ground pixel rate and the number of straight lines. Accordingly, an area can be extracted, the area having necessity for character judgment and a lower possibility of misjudgments.

An area that does not need character judgment based on the parameters, i.e., the area judged to be the photographic area by the area judging unit 302 particularly has a higher possibility to be misjudged. Furthermore, the misjudged area has a remarkably deteriorated image quality. Therefore, avoidance of character judgment on the photograph area can reduce image quality deterioration in the photograph area.

(b) Rectangular Area Determination Processing (S502)

Next, the rectangular area determination processing (S502) will be described in detail with reference to FIG. 8.

Figure 8:
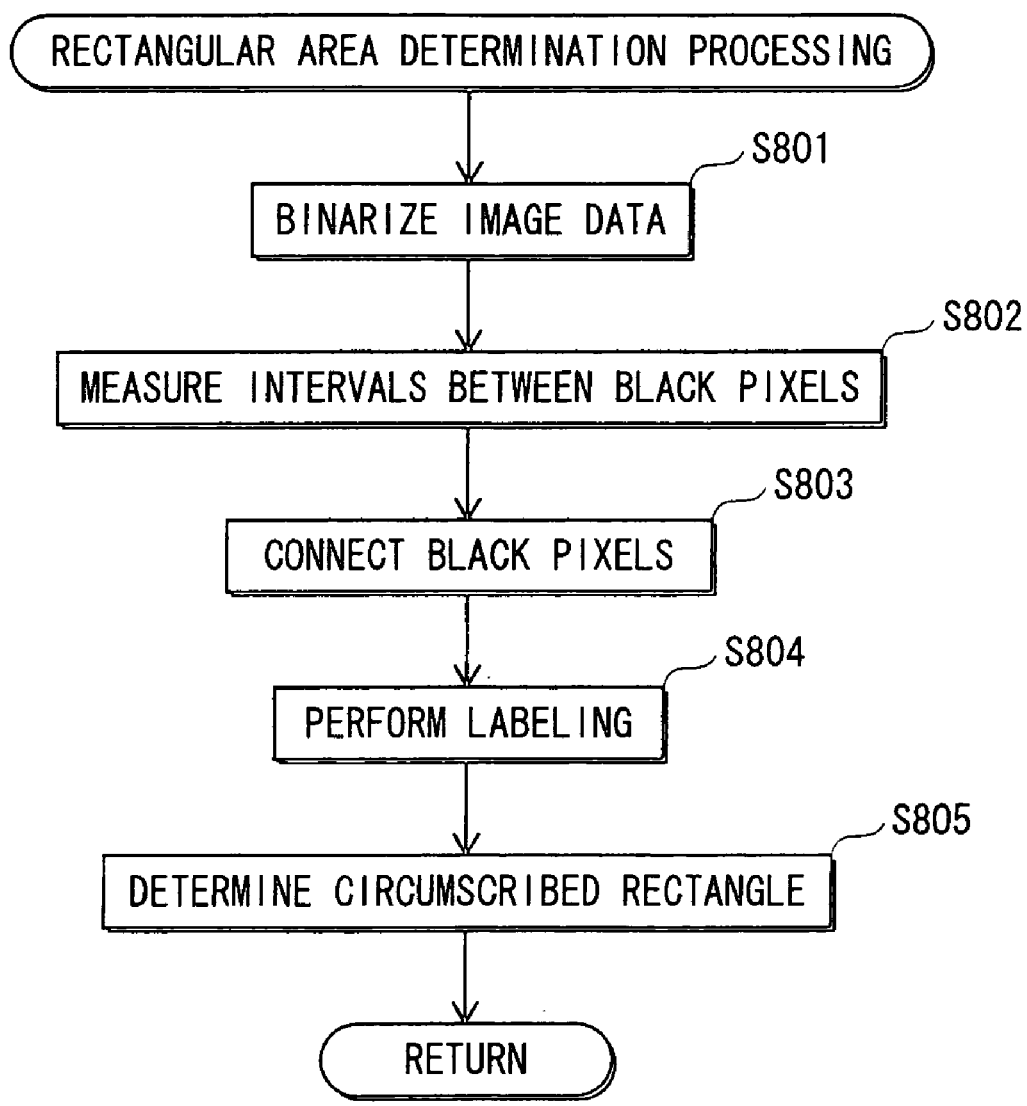
FIG. 8 is a flow chart showing in detail rectangular area determination processing (S502) according to the embodiment of the present invention.

As shown in FIG. 8, the area judging unit 302 firstly binarizes image data using an appropriate threshold value (S801).

In the present embodiment, binarization is performed using a variable threshold. That is, the area judging unit 302 binarizes the image data using a threshold value. The threshold value is a value in which a predetermined value has been subtracted from the maximum value of gradation values of pixels of four corners for each square area having 5×5 pixels. This can obtain a binary image composed of two-color pixels of black pixels and white pixels.

Next, the area judging unit 302 measures intervals between adjacent black pixels in the main scanning direction and the subscanning direction, respectively (S802). If the number of white pixels between the adjacent black pixels is no more than a predetermined number of pixels, the area judging unit 302 replaces the white pixels with black pixels. As a result, the adjacent black pixels are mutually connected (S803) In this way, successive characters including words, text lines, etc. can be integrated as one connected area.

Next, the area judging unit 302 performs label processing on the black pixels (S804). That is, the area judging unit 302 allocates a common label to the adjacent black pixels. The area judging unit 302 determines a rectangle circumscribing black pixels having a common label allocated thereto (S805). This circumscribed rectangle is a rectangular area to be determined in the processing.

(c) Straight Line Count Processing (S507)

Next, the straight line count processing (S507) will be described in detail.

Compared with photographs, tables and graphs tend to have many horizontal straight lines and vertical straight lines. Therefore, detection of the number of such straight lines can distinguish tables and graphs from photographs.

A method of detecting straight lines using a differential filter is known, for example. In this method, though short line segments are easily detected as straight lines, slightly inclined lines cannot be detected. Moreover, only straight lines having a predetermined line width can be detected. Therefore, the method cannot achieve the purpose of the present embodiment.

Accordingly, in the straight line count processing (S507), the existence of straight lines is judged based on the difference of the number of black pixels between scanning lines extended to the main scanning direction and the subscanning direction respectively, and then the number of straight lines is counted. Note that, in order to improve the precision in detecting straight lines, inclination correction is performed beforehand.

Figure 9:
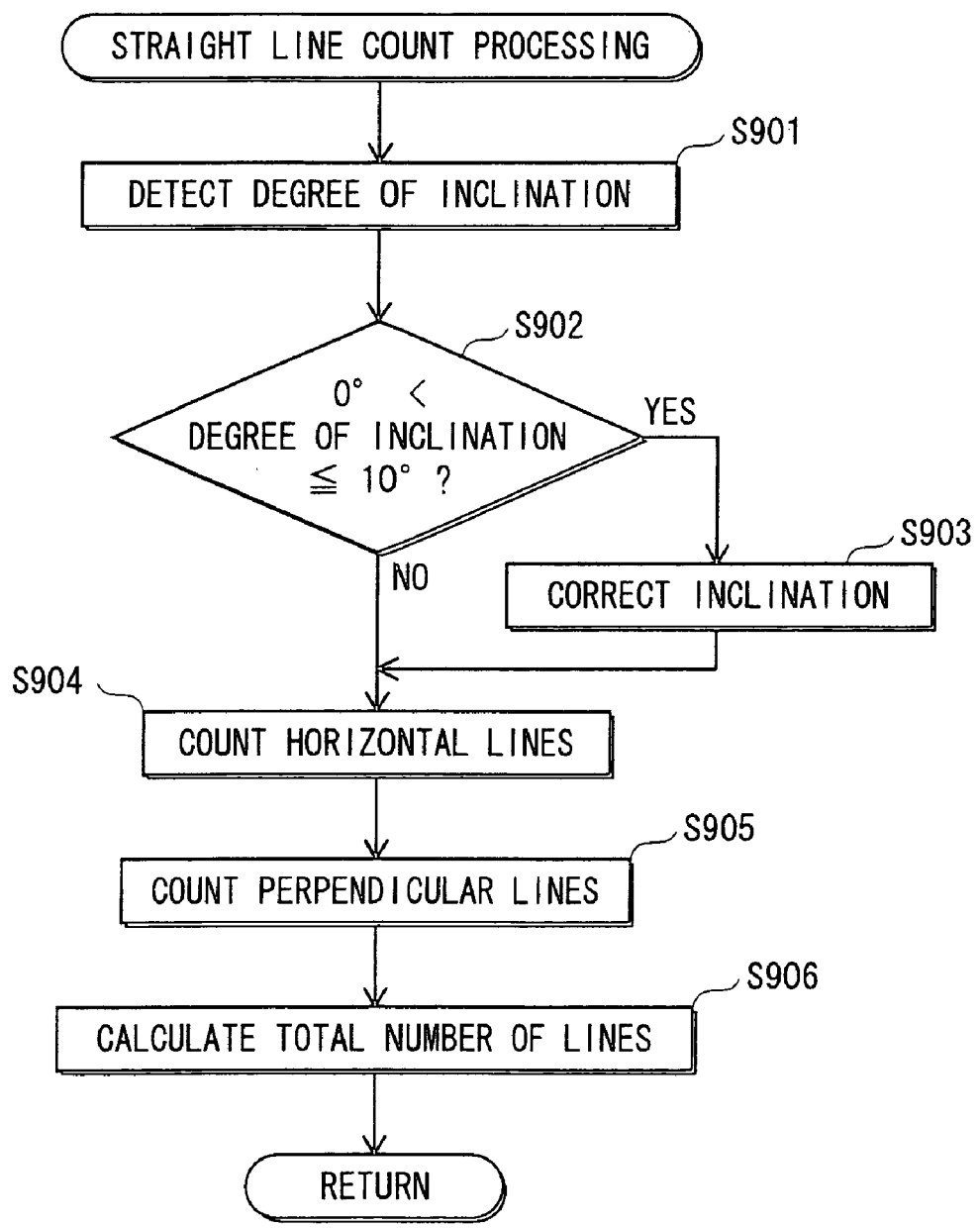
FIG. 9 is a flow chart showing straight line count processing (S507) according to the embodiment of the present invention.

The straight line count processing (S507) will be described with reference to FIG. 9. As shown in FIG. 9, a degree of inclination of a black pixel portion is firstly detected in each rectangular area (S901). This degree of inclination is calculated based on an aspect ratio of a white pixel portion having a triangle shape in a longer side of a circumscribed rectangle.

Figure 10A:
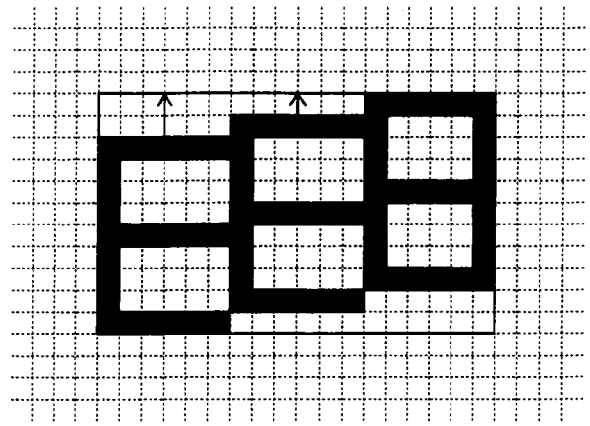
FIGS. 10A to 10C show an example of a process of inclination correction according to the embodiment of the present invention.
Figure 10B:
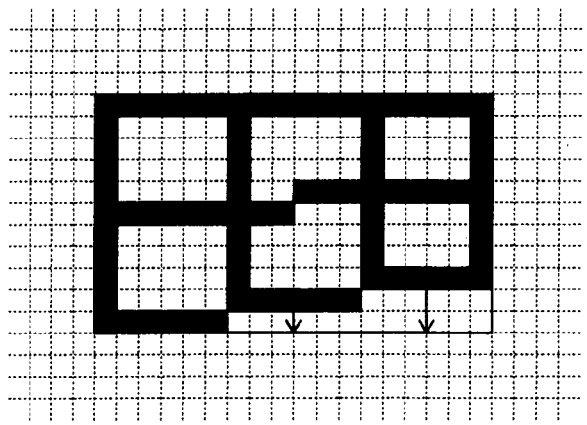
Figure 10C:
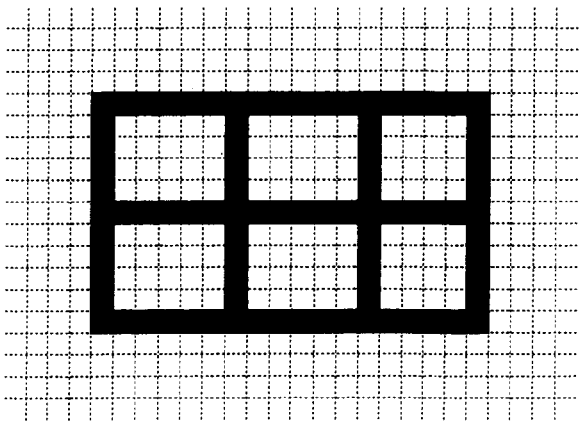

If the degree of inclination is greater than 0 degree to no more than 10 degrees (S902: YES), the inclination of the black pixel portion is corrected (S903). An example of the process of the inclination correction is shown in FIGS. 10A, 10B, and 10C, where the processing proceeds in order of FIG. 10A to FIG. 10C. As shown in FIG. 10A, white pixel portions having a triangle shape are in upper left and lower right parts, and each oblique side inclines in the main scanning direction by a little less than 10 degrees.

As shown in FIG. 10B, black pixel portions are extended in proportion to a size of a blank space, and as a result, the white pixel portion in upper left is removed. Similarly, as shown in FIG. 10C, black pixel portions are extended in proportion to a size of a blank space, and as a result, the white pixel portion in lower right is removed. As described above, the inclinations of the black pixel portions are corrected.

Next, the number of horizontal lines in the rectangular area is counted (S904). That is, between adjacent scanning lines having a width of one pixel in the sub-scanning direction, if the number of the black pixels differs from the number of pixels in the main scanning direction of the circumscribed rectangle by no less than one-fourth, a scanning line having more black pixels is counted as one horizontal line.

Moreover, the number of vertical lines in the rectangular area is counted (S905). That is, between adjacent scanning lines having a width of one pixel in the main scanning direction, if the number of the black pixels differs from the number of pixels in the sub-scanning direction of the circumscribed rectangle by no less than one-fourth, a scanning line having more black pixels is counted as one vertical line.

Subsequently, the number of horizontal lines and the number of vertical lines are totaled as the number of straight lines (S906), and then, the straight line count processing ends.

(d) Edge Pixel Ratio

Generally, rectangular areas including a table tend to have more characters than that of rectangular areas including a graph. Accordingly, table areas and graph areas are judged using this tendency. In the present embodiment, when calculating an edge pixel rate, a character part has not been determined yet. Accordingly, a proportion of the number of edge white pixels to the total number of white pixels is used instead of an edge pixel rate.

The edge pixel rate calculation processing will be described with reference to FIG. 11. As shown in FIG. 11, when calculating an edge pixel rate, the total number of white pixels is firstly counted (S1101). Next, an edge white pixel is detected (S1102). An example of a filter that detects a diagonal edge is shown in FIG. 12. The use of the filter shown in FIG. 12 can detect edge white pixels.

The number of the detected edge white pixels is counted (S1103), and the number of edge white pixels to the total number of white pixels is calculated, thereby an edge pixel rate can be obtained (S1104).

(e) Character Judgment Processing (S402)

Next, the character judgment processing (S402) will be described with reference to FIG. 13.

Figure 13:
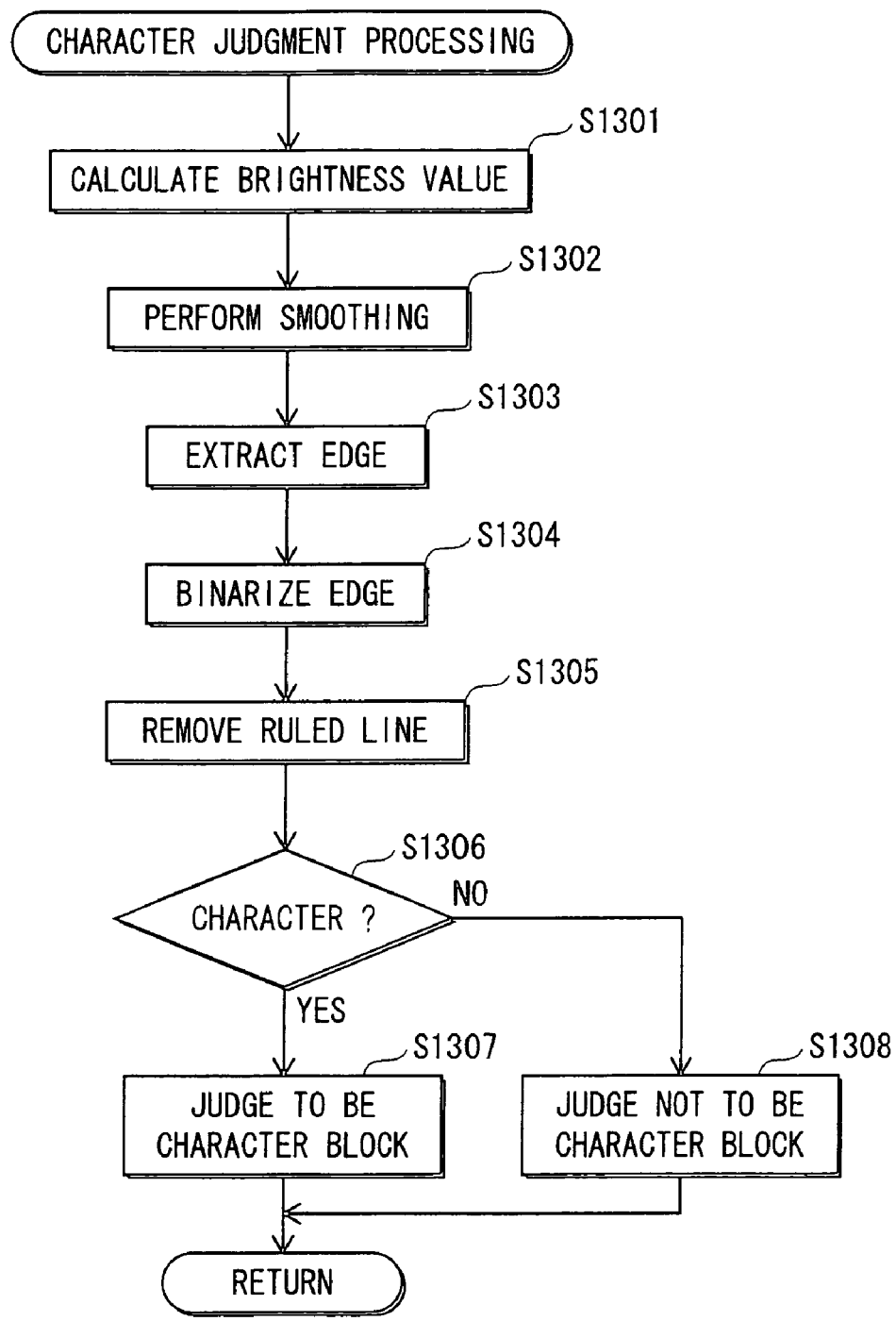
FIG. 13 is a flow chart showing character judgment processing (S402) according to the embodiment of the present invention.

As shown in FIG. 13, the area judging unit 302 firstly gradates 24-bit color image data in a character area to create 8-bit grayscale image data (S1301), and smoothes the image data (S1302).

Note that, in the character judgment processing (S402), the precision of character judgment is improved by performing smoothing weaker than that in the area extraction processing (S401). On the other hand, in the area extraction processing (S401), the processing is speeded up by performing stronger smoothing to easily connect images.

Subsequently, the area judging unit 302 extracts an edge (S1303), and binarizes the image (S1304). A "5×5" or "3×3" Gaussian filter may be used for this edge extraction, for example. Different from the case where a binary image is used, the edge extraction is performed using an 8-bit grayscale image in the present embodiment. Accordingly, a character in an area having a higher brightness value and a reversed character can be detected.

In order to reduce misjudgment of characters due to ruled lines such as tables and underlines, such ruled lines are removed (S1305), and then character judgment is performed. This character judgment is for judging whether a given image is a character, and not for judging what character the given image is.

Whether the given image is a character may be judged by removing a blank space from the rectangular area, and judging whether the remaining part has a aspect ratio within an appropriate range. Also, whether the given image is a character may be judged by extracting characteristics of a portion to be a target of character judgment, and comparing the characteristics with the reference data.

If an image is judged to be a character in the character judgment (S1306: YES), the area judging unit 302 judges that the portion is a character block (S1307). If the image is not judged to be a character (S1306: NO), the area judging unit 302 judges that the portion is not a character block (S1308).

(f) Representative Color Determination Processing (S403)

Next, the representative color determination processing (S403) will be described with reference to FIG. 14.

Figure 14:
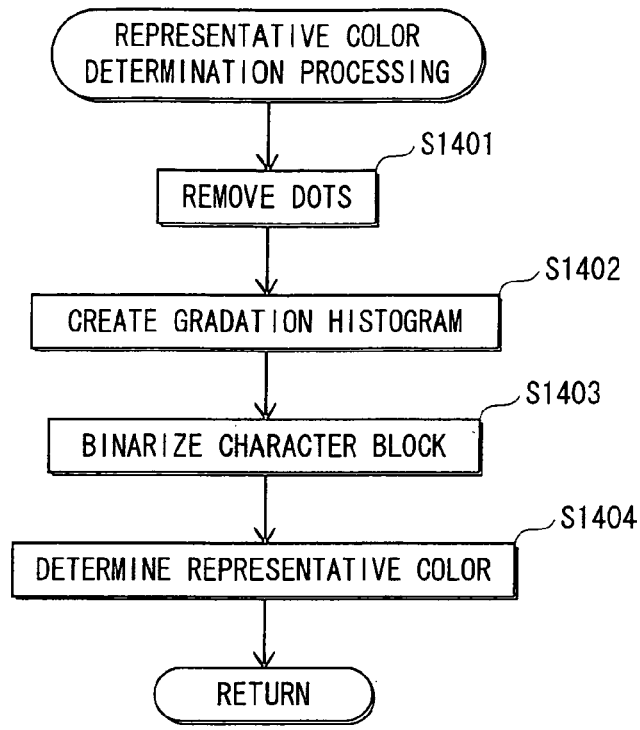
FIG. 14 is a flow chart showing representative color determination processing (S403) according to the embodiment of the present invention.

As shown in FIG. 14, the area judging unit 302 firstly removes dots in a character block (S1401), thereby preventing a dot portion in a background of a character from being binarized to become spots.

Next, the area judging unit 302 creates a gradation histogram in each character block (S1402), determines a threshold value based on this histogram, and binarizes the character block (S1403). According to this, a character and a background can be separated in a character block, and simultaneously the file size can be reduced.

And then, the area judging unit 302 refers to a character color of a remaining portion after the binarization, to determine one color as a representative color in each character block (S1404).

Moreover, the area judging unit 302 integrates close character blocks having similar representative colors, and sets the character blocks as one character block, thereby reducing the total number of character blocks to reduce the file size.

Figure 15:
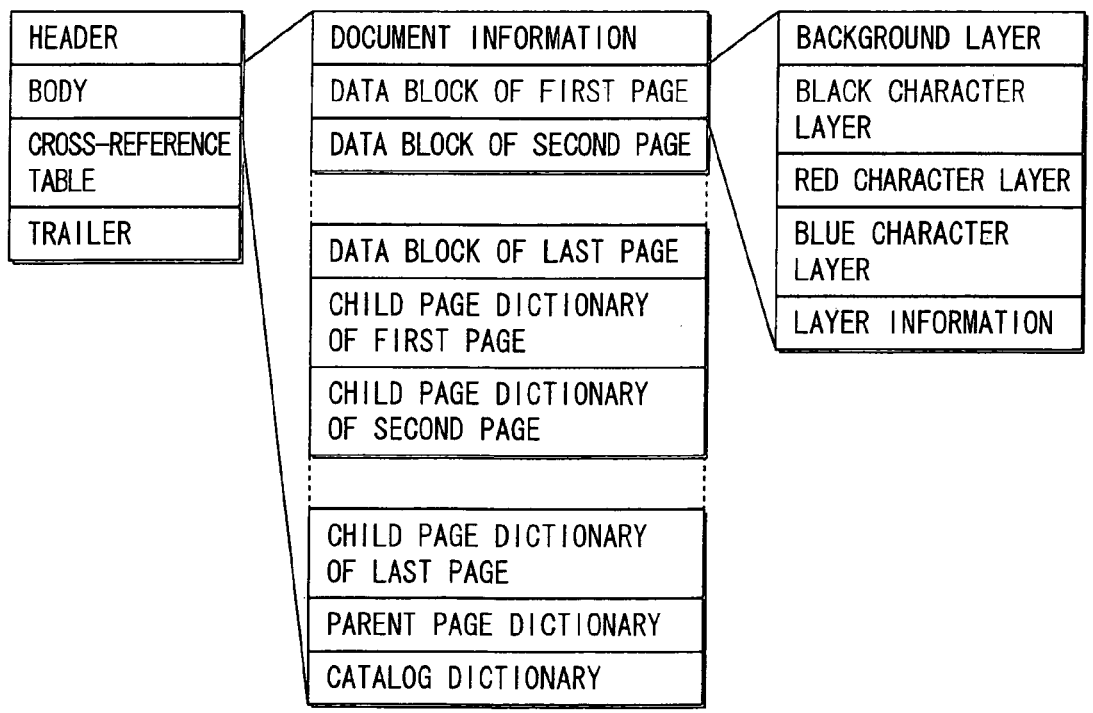
FIG. 15 shows an example of a data structure of a compact PDF file.

An example of a data structure of a compact PDF file is shown in FIG. 15. As shown in FIG. 15, the compact PDF file includes a header, a body, a cross-reference list, and a trailer.

The header stores PDF specification versions. The body stores document contents. The cross-reference list stores positions of objects in the body. The trailer stores the number of objects in the PDF file, and object numbers of a catalog dictionary.

The body stores, as the document contents, document information including dates, etc., data blocks of each page, child page dictionaries of each page, a parent page dictionary, and the catalog dictionary. The catalog dictionary stores parent page dictionary numbers. The parent page dictionary stores the total number of pages and child page dictionary numbers. Moreover, the child page dictionary stores data block formats, etc.

Each data block includes a background layer, a black color character layer, a red color character layer, a blue color character layer, and layer information. The background layer stores JPEG-compressed data. Each color character layer stores MMR-compressed data that has been binarized. The layer information stores positions of each layer, and character colors in each character layer.

The layer information stores representative colors determined in the above-described way.

Since the compact PDF has such data structure as described above, integration of character blocks reduces the number of data blocks in each page, thereby reducing the file size.

MODIFICATION EXAMPLE

Although the present invention has been described based on the embodiment, needless to say, the present invention is not limited to the above embodiment, and may include the following modification examples.

(1) In the above-described embodiment, the case where the processing is branched based on only whether a ground pixel rate is no less than 66% has been described. However, needless to say, the present invention is not limited to this, and the following may be employed instead.

In a smaller rectangular area including a character, a peak of a histogram in a ground tends to be lower. Therefore, even when a smaller rectangular area has a lower ground pixel rate, a marginal pixel rate of the rectangular area is judged, thereby improving the precision of area judgment.

(2) In the above-described embodiment, the case where the image data of the document scanned by the MFP 1 is compressed has been mainly described. However, needless to say, the present invention is not limited to this structure, and the following may be employed instead.

Figure 16:
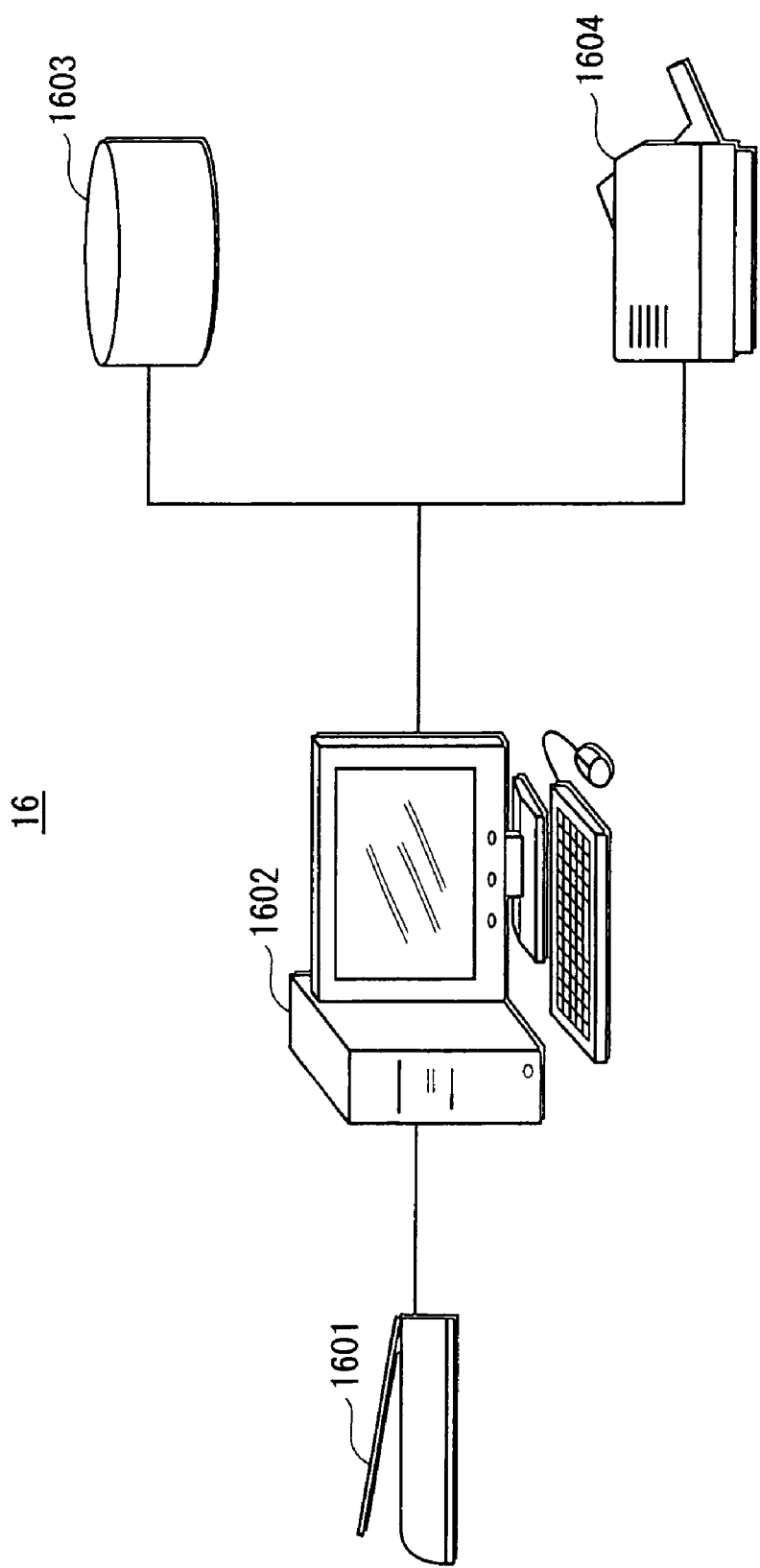
FIG. 16 shows a structure of an image processing system according to a modification example (2) of the present invention.

Referring to FIG. 16, a structure of an image processing system according to the modification example will be described.

As shown in FIG. 16, an image processing system 16 includes an image scanner 1601, an image processing apparatus 1602, an external storage apparatus 1603, and an image output apparatus 1604. The image scanner 1601, the image processing apparatus 1602, the external storage apparatus 1603, and the image output apparatus 1604 are mutually connected via a communication line.

The image scanner 1601 scans document images in units of pages to create image data. The image scanner 1601 transmits the image data to the image processing apparatus 1602 via the communication line.

Upon receiving the image data from the image scanner 1601, the image processing apparatus 1602 judges a character area in the same way as the MFP 1, and then compresses the image data. The image processing apparatus 1602 transmits the compressed image data to the external storage apparatus 1603. The image processing apparatus 1602 may be a personal computer, for example.

The external storage apparatus 1603 includes a hard disk drive. Upon receiving the image data compressed by the image processing apparatus 1602 via the communication line, the external storage apparatus 1603 stores the compressed image data in the hard disk drive.

Upon receiving a print instruction in which image data is specified from the image processing apparatus 1602 via the communication line, the image output apparatus 1604 reads the specified image data from the external storage apparatus 1603. And then, the image output apparatus 1604 decompresses the image data, and then prints the image data on a recording paper.

Even with above-described structure, the size of the compressed image data can be reduced, and simultaneously, a time period for decompression of the image data by the image output apparatus 1604 can be reduced.

(3) In the above-described embodiment, the image processing apparatus according to the present invention has been described mainly using the MFP 1 as an example. However, needless to say, the present invention is not limited to this, the following may be employed instead.

That is, the present invention may be the image processing method performed by the MFP 1 and the image processing apparatus 1602, the image processing program for causing a computer to operate as the image processing apparatus 1602. Any case described above can achieve the effect of the present invention.

Although the present invention has been described by way of examples with reference to the accompanying drawings, it is to be noted that various changes and modifications will be apparent to those skilled in the art.

Therefore, unless otherwise such changes and modifications depart from the scope of the present invention, they should be constructed as being included therein.

What is claimed is:

1. An image processing apparatus that determines an area for an object in an image, and performs compression for the area using a compression method determined depending on whether the object is a character, the image processing apparatus comprising:

a size judging unit operable to judge whether the area is smaller than a predetermined size;

a ground judging unit operable to judge, for the area, whether a proportion of a number of pixels having a substantially common color with respect to at least one color to a total number of pixels is no less than a predetermined proportion; and a character judging unit operable, only if one of the size judging unit and the ground judging unit judges affirmatively, to judge whether the object is a character.

2. An image processing apparatus that determines an area for an object in an image, and performs compression for the area using a compression method determined depending on whether the object is a character, the image processing apparatus comprising:

a size judging unit operable to judge whether the area is smaller than a predetermined size;

a straight line judging unit operable to judge whether a total number of vertical straight lines and horizontal straight lines in the area is no less than a predetermined number; and a character judging unit operable, only if one of the size judging unit and the straight line judging unit judges affirmatively, to judge whether the object is a character.

3. An image processing apparatus that determines an area for an object in an image, and performs compression for the area using a compression method determined depending on whether the object is a character, the image processing apparatus comprising:
- a size judging unit operable to judge whether the area is smaller than a predetermined size;
- a ground judging unit operable to judge, for the area, whether a proportion of a number of pixels having a substantially common color with respect to at least one color to a total number of pixels is no less than a predetermined proportion;
- a straight line judging unit operable to judge whether a total number of vertical straight lines and horizontal straight lines in the area is no less than a predetermined number; and
- a character judging unit operable, only if one of the size judging unit, the ground judging unit, and the straight line judging unit judges affirmatively, to judge whether the object is a character.

4. The image processing apparatus of claim 3, wherein
if the size judging unit judges negatively, the ground judging unit judges with respect to the area, and
if the ground judging unit judges negatively, the straight line judging unit judges with respect to the area.

5. An image processing apparatus that determines an area for an object in an image, and performs compression for the area using a compression method determined depending on whether the object is a character, the image processing apparatus comprising:
- a size judging unit operable to judge whether the area is smaller than a predetermined size;
- a ground judging unit operable to judge, for the area, whether a proportion of a number of pixels having a substantially common color with respect to at least one color to a total number of pixels is no less than a predetermined proportion; and
- a character judging unit operable to judge whether the object is a character, if the size judging unit judges affirmatively, or if the following conditions area all satisfied:
  - (a) the ground judging unit judges affirmatively;
  - (b) a proportion of a number of object pixels to a total number of pixels in the area is no more than a predetermined proportion; and
  - (c) a proportion of a number of object pixels adjacent to a non-object pixel to a total number of object pixels is no less than a predetermined proportion.

6. An image processing apparatus that determines an area for an object in an image, and performs compression for the area using a compression method determined depending on whether the object is a character, the image processing apparatus comprising:
- a size judging unit operable to judge whether the area is smaller than a predetermined size;
- a ground judging unit operable to judge, for the area, whether a proportion of a number of pixels having a substantially common color with respect to at least one color to a total number of pixels is no less than a predetermined proportion;
- a straight line judging unit operable to judge whether a total number of vertical straight lines and horizontal straight lines in the area is no less than a predetermined number; and
- a character judging unit operable to judge whether the object is a character, if one of the size judging unit and the straight line judging unit judges affirmatively, or if the following conditions area all satisfied:
  - (a) if the ground judging unit judges affirmatively;
  - (b) a proportion of a number of object pixels to a total number of pixels in the area is no more than a predetermined proportion; and
  - (c) a proportion of a number of object pixels adjacent to a non-object pixel to a total number of object pixels is no less than a predetermined proportion.

7. The image processing apparatus of any of claim 1, wherein
the area including the object being a character is lossless-compressed, and the area not including the object being a character is lossy-compressed.

8. The image processing apparatus of claim 2, wherein
the area including the object being a character is lossless-compressed, and the area not including the object being a character is lossy-compressed.

9. The image processing apparatus of claim 3, wherein
the area including the object being a character is lossless-compressed, and the area not including the object being a character is lossy-compressed.

10. The image processing apparatus of claim 7, wherein
the lossless-compression is performed using an MMR system, and the lossy-compression is performed using a JPEG system.

11. The image processing apparatus of claim 8, wherein
the lossless-compression is performed using an MMR system, and the lossy-compression is performed using a JPEG system.

12. The image processing apparatus of claim 9, wherein
the lossless-compression is performed using an MMR system, and the lossy-compression is performed using a JPEG system.

13. The image processing apparatus of claim 1, wherein the area is a rectangular area.

14. The image processing apparatus of claim 2, wherein the area is a rectangular area.

15. The image processing apparatus of claim 3, wherein the area is a rectangular area.

16. An image processing method that determines an area for an object in an image, and performs compression for the area using a compression method determined depending on whether the object is a character, the image processing method comprising:
- a size judging step of judging whether the area is smaller than a predetermined size;
- a ground judging step of judging, for the area, whether a proportion of a number of pixels having a substantially common color with respect to at least one color to a total number of pixels is no less than a predetermined proportion; and
- a character step of judging whether the object is a character, only if one of the size judging unit and the ground judging unit judges affirmatively.

17. An image processing method that determines an area for an object in an image, and performs compression for the area using a compression method determined depending on whether the object is a character, the image processing method comprising:
- a size judging step of judging whether the area is smaller than a predetermined size;
- a straight line judging step of judging whether a total number of vertical straight lines and horizontal straight lines in the area is no less than a predetermined number; and a character judging step of judging whether the object is a character, only if one of the size judging unit and the straight line judging unit judges affirmatively.

18. An image processing method that determines an area for an object in an image, and performs compression for the area using a compression method determined depending on whether the object is a character, the image processing method comprising:

a size judging step of judging whether the area is smaller than a predetermined size;

a ground judging step of judging, for the area, whether a proportion of a number of pixels having a substantially common color with respect to at least one color to a total number of pixels is no less than a predetermined proportion;

a straight line judging step of judging whether a total number of vertical straight lines and horizontal straight lines in the area is no less than a predetermined number; and a character judging step of judging whether the object is a character, only if one of the size judging unit, the ground judging unit, and the straight line judging unit judges affirmatively.

19. A computer readable medium storing an image processing program that determines an area for an object in an image, and performs compression for the area using a compression method determined depending on whether the object is a character, the image processing program comprising:

a size judging step of judging whether the area is smaller than a predetermined size;

a ground judging step of judging, for the area, whether a proportion of a number of pixels having a substantially common color with respect to at least one color to a total number of pixels is no less than a predetermined proportion; and a character step of judging whether the object is a character, only if one of the size judging unit and the ground judging unit judges affirmatively.

20. A computer readable medium storing an image processing program that determines an area for an object in an image, and performs compression for the area using a compression method determined depending on whether the object is a character, the image processing program comprising:

a size judging step of judging whether the area is smaller than a predetermined size;

a straight line judging step of judging whether a total number of vertical straight lines and horizontal straight lines in the area is no less than a predetermined number; and a character judging step of judging whether the object is a character, only if one of the size judging unit and the straight line judging unit judges affirmatively.

21. A computer readable medium storing an image processing program that determines an area for an object in an image, and performs compression for the area using a compression method determined depending on whether the object is a character, the image processing program comprising:

a size judging step of judging whether the area is smaller than a predetermined size;

a ground judging step of judging, for the area, whether a proportion of a number of pixels having a substantially common color with respect to at least one color to a total number of pixels is no less than a predetermined proportion;

a straight line judging step of judging whether a total number of vertical straight lines and horizontal straight lines in the area is no less than a predetermined number; and a character judging step of judging whether the object is a character, only if one of the size judging unit, the ground judging unit, and the straight line judging unit judges affirmatively.

* * * * *